3,085,046
3,3'-HYDROCARBONYLENE BIS (TETRAHYDRO-1,3,5-THIADIAZINE-2-THIONES), UNSYMMETRICALLY SUBSTITUTED CORRESPONDING COMPOUNDS, FUNGICIDAL COMPOSITIONS, AND METHODS
Earl W. Cummins, Wilmington, Del., assignor to E. I. du Pont de Nemours and Company, Wilmington, Del., a corporation of Delaware
No Drawing. Filed July 3, 1961, Ser. No. 121,351
20 Claims. (Cl. 167—33)

This invention relates to certain 3,3'-hydrocarbonylene bis(tetrahydro-1,3,5-thiadiazine-2-thiones) (and unsymmetrical) and to fungicidal compositions and methods employing these compounds for the protection of organic matter subject to fungus infection.

It has been found that the compounds represented by the following formula are extremely effective as active ingredients in fungicidal compositions and methods.

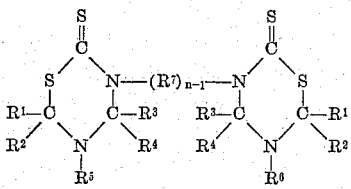

wherein $R^1$, $R^2$, $R^3$ and $R^4$ can be the same or different and are selected from the group consisting of hydrogen and monovalent organic radicals;
$R^5$ and $R^6$ can be the same or different and are selected from the group consisting of hydrogen, sulfo and its salts, hydroxy and monovalent organic radicals;
$R^7$ is a non-aromatic divalent organic radical; and
$n$ is a positive integer of less than three, that is, $n$ is 1 or 2.

When $n$ is 1, the heterocyclic rings are of course bonded together directly through the ring nitrogens.

By way of illustration but not limitation, when $R^1$, $R^2$, $R^3$, $R^4$, $R^5$ and/or $R^6$ are monovalent organic radicals, they can be, for example, substituted or unsubstituted alkyl (1–18 carbons), substituted or unsubstituted alkene (2–18 carbons), substituted or unsubstituted aryl, and/or substituted or unsubstituted cycloaliphatic.

Also by way of illustration but not limitation, $R^7$ can be, for example, substituted or unsubstituted alkylene (1–18 carbons), substituted or unsubstituted alkenylene (2–18 carbons), substituted or unsubstituted cycloalkylene, or substituted or unsubstituted alkynylene (2–18 carbons).

It will be understood that the novel symmetrical and unsymmetrical 3,3'-hydrocarbonylene bis(tetrahydro-1,3,5-thiadiazine-2-thione) compounds having the structural formula indicated above can have various substituents within the scope of this invention.

For example, $R^1$ and $R^3$ can be hydrogen and methyl; $R^2$ and $R^4$ substituents are hydrogen, alkyl (1–18 carbons), hydroxy alkyl (1–18 carbons), alkoxy alkyl (2–18 carbons), chloroalkyl (1–18 carbons), carboxy and its salts and esters, carboxyalkyl (2–18 carbons) and their salts, alkenyl (2–18 carbons), phenyl, chlorophenyl, nitrophenyl, alkoxyphenyl (7–18 carbons), carboxyphenyl, hydroxyphenyl, nitrochlorophenyl and alkylphenyl (7–18 carbons). ($R^1$ and $R^2$) and ($R^3$ and $R^4$) may be taken together to form a cyclohexyl ring.

Also, $R^5$ and $R^6$ substituents within the scope of this invention are hydrogen, cyano, sulfo and its salts, hydroxy, alkenoxy (2–18 carbons), alkoxy (1–18 carbons), amino, alkyl (1–18 carbons), alkylmercaptoalkyl (2–18 carbons), hydroxyalkyl (2–18 carbons), alkoxyalkyl (2–18 carbons), chloroalkyl (2–18 carbons), carboxyalkyl (2–18 carbons) and their salts, carboalkoxyalkyl (3–18 carbons), sulfatealkyl (1–18 carbons) and their salts, sulfoalkyl (1–18 carbons) and their salts, cyanoalkyl (2–18 carbons), phenyl, naphthyl, cyclohexyl, cyclopentyl, chlorophenyl, nitrophenyl, alkylphenyl (7–18 carbons), chloronitrophenyl, polychlorophenyl, alkoxyphenyl (7–18 carbons), haloalkoxyphenyl (7–18 carbons), dialkylphenyl, benzyl, chlorobenzyl, N-(hydroxyalkyl)aminoalkyl (3–18 carbons), hydroxy-carboxyalkyl (2–18 carbons) and their salts, alkylmercapto-carboxyalkyl (3–18 carbons) and their salts, and alkenoxyalkyl (3–18 carbons).

Also, $R^7$ moieties are alkylene (1–18 carbons), alkenylene (2–18 carbons), cyclohexylene, hydroxyalkylene (2–18 carbons), alkylenebis(oxyalkyl) (3–18 carbons), alkylnylene (2–18 carbons), carboxyalkylene (3–18 carbons) and their salts, oxydialkyl (2–18 carbons), and alkylcyclohexylene (7–18 carbons).

In the above, it will be understood that the generic terms such as chlorophenyl, chloroalkyl, hydroxyphenyl, hydroxyalkyl, and the like, include positional isomers and mono- and poly-substitution.

Particularly preferred from the standpoint of economy and ease of manufacture, as well as their outstanding fungicidal activity, are those compounds having the above formula wherein $R^1$ and $R^3$ are hydrogen, $R^2$ and $R^4$ are hydrogen or aliphatic groups of less than five carbons, and $R^7$ is ethylene. Aliphatic includes substituted and unsubstituted branched and straight chain alkyl and alkenyl groups, including carboxyalkyl such as carboxymethyl and carboxyethyl, hydroxyalkyl such as hydroxyethyl, hydroxyalkylaminoalkyl such as beta-(2-hydroxyethylamino)ethyl, and haloalkyl such as trichloromethyl.

Preferred species include symmetrical compounds where $R^1$, $R^2$, $R^3$ and $R^4$ are hydrogen; $R^5$ and $R^6$ are hydrogen, hydroxy, sulfoxy, methyl, ethyl, benzyl, carboxyalkyl such as carboxymethyl and carboxyethyl, and hydroxy substituted alkyl or hydroxy substituted alkylaminoalkyl such as 2-hydroxyethyl,2-hydroxypropyl, 2,2-dihydroxypropyl, (2-hydroxy-1,1-dimethyl)ethyl and 2-hydroxyethylaminoethyl; and $R^7$ is ethylene.

Particularly preferred compounds are:

3,3'-ethylenebis(tetrahydro-5-beta-carboxyethyl-2H-1,3,5-thiadiazine-2-thione)
3,3'-ethylenebis(tetrahydro-5-sulfoxy-2H-1,3,5-thiadiazine-2-thione)
3,3'-ethylenebis[tetrahydro-5-(2-hydroxyethylaminoethyl)-2H-1,3,5-thiadiazine-2-thione]
3,3'-ethylenebis[tetrahydro-5-(2,3-dihydroxypropyl)-2H-1,3,5-thiadiazine-2-thione]
3,3'-ethylenebis(tetrahydro-5-hydroxy-2H-1,3,5-thiadiazine-2-thione)
3,3'-ethylenebis(tetrahydro-5-benzyl-2H-1,3,5-thiadiazine-2-thione)
3,3'-ethylenebis(tetrahydro-4,6-diethyl-2H-1,3,5-thiadiazine-2-thione
3,3'-ethylenebis[tetrahydro-4,6-bis(trichloromethyl)-5-hydroxy-2H-1,3,5-thiadiazine-2-thione]
3,3'-ethylenebis(tetrahydro-5-beta-hydroxyethyl-2H-1,3,5-thiadiazine-2-thione)

3,3'-ethylenebis(tetrahydro-4,5,6-trimethyl-2H-1,3,5-thiadiazine-2-thione)

3,3'-ethylenebis(tetrahydro-4,6-dimethyl-2H-1,3,5-thiadiazine-2-thione)

3,3'-ethylenebis(tetrahydro-5-carboxymethyl-2H-1,3,5-thiadiazine-2-thione)

3,3'-ethylenebis[tetrahydro-5-(2-hydroxy-1,1-dimethylethyl)-2H-1,3,5-thiadiazine-2-thione]

3,3'-ethylenebis[tetrahydro-5-(2-hydroxypropyl)-2H-1,3,5-thiadiazine-2-thione]

3,3'-ethylenebis(tetrahydro-5-ethyl-2H-1,3,5-thiadiazine-2-thione)

3,3'-ethylenebis(tetrahydro-5-methyl-2H-1,3,5-thiadiazine-2-thione)

The fungicidally active compounds of the above formula can be prepared by various means. For example, the compounds represented by the above formula can be prepared by reacting one molar equivalent of a primary diamine with two molar equivalents of an alkali hydroxide and two molar equivalents of carbon disulfide in water or lower alcoholic media to give a solution of the alkali salt of a bis-dithiocarbamic acid. The temperature of the reactants is maintained between 0 and 45° C. by external cooling. A solution of two molar equivalents of the salt of a primary mono-amine and a strong acid in aqueous or lower alcoholic media is then added rapidly with agitation. Immediately upon completion of this addition, an aqueous or lower alcoholic solution of four molar equivalents of an aldehyde are added rapidly while the temperature is maintained between 0 and 50° C. This results in the precipitation of the desired product which can be removed from the reation mixture by filtration. It is then washed with water or a lower aliphatic alcohol and dried.

Alternatively, the aldehyde can be added to the solution of the alkali salt of the bis-dithiocarbamic acid followed by the addition of the solution of the mono-amine salt; or the aldehyde can be added to the solution of the mono-amine salt followed by the addition of the alkali salt of the bis-dithiocarbamic acid.

The conditions of the reaction, for example the exact temperature employed, the amount and type of solvent for the reactants, the rate of addition of the aldehyde, etc., will be dependent on the reactants employed. It is generally desirable, however, that the salts of the dithiocarbamic acid and amine salts be completely soluble in the reaction solvent.

The products of the reaction can be used as is or purified by crystallization from solvents such as nitrobenzene, dimethyl formamide, dimethyl sulfoxide and nitromethane.

The aldehydes that may be employed in the present invention are disclosed in a later section. Ketones may be employed in place of the aldehydes. For example, such ketones as acetone, acetoacetic ester, p-chloroacetophenone, etc. may be used.

The fungicidal compounds of the present invention are in general pure white compounds having melting points in the range of 125 to 250° C. They are essentially insoluble in water and alcohols.

In practicing the fungicidal methods of my invention, one or more of the active ingredients is applied to the organic material to be treated for the control of fungi at a dosage sufficient to exert fungicidal action. Accordingly, my compositions and methods are applicable for the protection of carbohydrates, proteins and fats. They are particularly suited for the treating of living plant life such as vegetables, ornamental plants and fruit-bearing trees. Also they can be used to treat organic fibers and fabrics, leather and various cellulosic materials such as wood. Likewise they can be used to treat paints and lubricating oils.

In application to plants, fungicidal control is obtained in most instances by applying the active compound at a dosage or rate from about 0.5 to 10 pounds per acre, the optimum amount within this range being largely dependent upon the variables mentioned hereafter. It is, of course, determined by and dependent upon the particular fungicidal compound selected, the method of application, and, in the case of application to vegetation, the state and condition of growth of the vegetation to be treated, and the climatic conditions.

The fungicidal compositions of my invention contain in sufficient amount to exert fungicidal action one or more of the above-described active compounds in admixture with a carrier material or conditioning agent of the kind used and commonly referred to in the art as a fungicide adjuvant or modifier. The conventional fungicide adjuvants are inert solids, hydrocarbon liquid diluents and surface-active agents. They provide formulations adapted for ready and efficient application using conventional applicator equipment. Usually from about 1 to 95% by weight of the fungicidal composition is active ingredient.

Solid compositions are preferably in the form of powders. They are compounded to be homogeneous powders that can be either used as such, diluted with inert solids to form dusts, or suspended in a suitable liquid medium for spray application. The powders usually comprise active ingredient admixed with minor amounts of conditioning agent. Natural clays, either adsorptive such as attapulgite or relative non-adsorptive such as kaolin clays, diatomaceous earth, walnut shell flour, tobacco dust, redwood flour, synthetic fine silica, calcium silicate and other inert solid carriers of the kind conventionally employed in powder fungicidal compositions can be used. The active ingredient usually makes up from about 25 to 80% of these powder compositions. For conversion of the powders to dusts, talc, pyrophyllite, tobacco dust, volcanic ash and other dense, rapid-settling inert solids customarily are used.

Liquid compositions employing one or more of the fungicidally-active ingredients are prepared by admixing the active ingredient with a suitable liquid diluent medium. The active ingredient can be either in solution or in suspension in the liquid medium. Typical of the liquid media commonly employed as fungicide adjuvants are kerosene, Stoddard solvent, xylene, alcohols, alkylated naphthalene and glycols. The active ingredient usually makes up from about 0.5 to 50% of these liquid compositions. Some of these compositions are designed to be used as such, and others to be extended with large quantities of water.

Compositions in the form of wettable powders or liquids in many cases also include one or more surface-active agents such as wetting, dispersing or emulsifying agents. These materials cause the compositions to disperse or emulsify easily in water to give aqueous sprays.

The surface-active agents employed can be of the anionic, cationic or nonionic type. They include, for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon entitled "Synthetic Detergents and Emulsifiers," volume 31, 1955, of "Soap and Chemical Specialties."

In some cases it may be desirable to employ the active compounds of the present invention in combination with other fungicides to give compositions that have broad spectrum fungicidal activity. In these mixtures, the fungicidally active materials can be present in any desired amount, ordinarily from about 0.1–20 parts by weight of a compound represented by Formula 1 per part by weight of the auxiliary fungicidally active material. In some instances it may even be desirable to employ two or more auxiliary fungicides.

Typical of the auxiliary fungicides that can be employed in combination with the compounds of the present invention are the following:

N-trichloro-methylthio-4-cyclohexene-1,2-dicarboximide
Tetramethylthiuram disulfide
Manganese ethylene-bis-dithiocarbamate
Ferric dimethyl dithiocarbamate
Zinc ethylene-bis-dithiocarbamate Zinc dimethyl dithiocarbamate (ziram)
Tetra copper calcium oxychloride
Tetrachloro-p-benzoquinone (chloranil)
2,3-dichloro-1,4-naphthoquinone (dichlone)
2-dichloro-6-(o-chloroanilino)triazine (dyrene)

Ethylene thiuram monosulfide
2-heptadecyl glyoxalidine acetate (glyodin)
Ferric dimethyl dithiocarbamate plus 2-mercaptobenzothiazole
Manganese dimethyl dithiocarbamate plus 2-mercaptobenzothiazole
Copper dihydrazinium sulfate Copper-8-quinolinolate
Cycloheximide
Terramycin
Streptomycin In order that the invention may be better understood, the following examples are given:

EXAMPLE 1

A solution of 412 parts of the sodium salt of ethylene-bisdithiocarbamic acid in 1832 parts of water is prepared in a stirred reactor as described in U.S. 2,693,485. A solution of 270 parts of methylamine hydrochloride in 910 parts of water is added during twenty seconds. After an additional 15 seconds a solution of 240 parts of formaldehyde in 416 parts of water is added during 45 seconds. Product begins to precipitate after about one-half of the formaldehyde solution has been added. The temperature is maintained at 25° to 36° C. by external cooling for an additional two hours. The product is isolated by filtration, washed with water and dried to give 611 parts (95% of theory) of a pure white product, M.P. 185° to 187° C. This product appears to be very pure 3,3'-ethylenebis(tetrahydro-5-methyl-2H-1,3,5 - thiadiazine-2-thione) since material purified by successive crystallizations from nitrobenzene and dimethylsulfoxide melts only one degree higher.

This compound is applied to tomato foliage as an aqueous dispersion at a concentration of 0.008%. When the spray deposit dries, the foliage is inoculated with the spores of the apple scab fungus (*Venturia inaequalis*). After a suitable incubation time the leaves are examined for disease. It is found that the treated leaves have 4% disease while untreated control leaves have 100% disease.

EXAMPLE 2

A solution of 128 parts of the sodium salt of ethylene-bisdithiocarbamic acid is prepared by adding 76.1 parts of carbon disulfide and a solution of 40 parts of sodium hydroxide in 100 parts of water simultaneously during one hour to a solution of 30 parts of ethylene diamine in 263 parts of water with good agitation while the temperature is maintained below 33° C. by external cooling. After an additional hour, the resulting solution is diluted with 20 parts of water. A solution of 81.5 parts of ethylamine hydrochloride in 200 parts of water is then added during 30 seconds. After an additional 15 seconds, a solution of 60 parts of formaldehyde in 104 parts of water is added during thirty seconds. After two hours at 25° to 35° C., the product is isolated by filtration, washed with water and dried. The resulting pure white powder contains a substantial amount of 3,3-ethylenebis(tetrahydro - 5 - ethyl - 2H - 1,3,5 - thiadiazine-2-thione).

The compound is applied to pear trees as an aqueous dispersion at a concentration of 0.008%. When the spray deposit dries, the foliage is inoculated with the spores of the pear scab fungus (*Venturia pyrina*). After a suitable incubation time the leaves are examined for disease. It is found that the treated leaves have essentially no disease while the untreated control leaves have 100% disease.

EXAMPLES 3 TO 109

The following compounds of the present invention are prepared in accordance with the procedure of Example 2 by substituting for the reactants of Example 2 equimolar amounts of the reactants set forth in Table I.

Table I

| Ex. | Diamine | Aldehyde or ketone | Amine | Product |
|---|---|---|---|---|
| 3 | Ethylenediamine | Formaldehyde | Ammonia | 3,3'-ethylenebis(tetrahydro-2H-1,3,5-thiadiazine-2-thione). |
| 4 | do | do | Isopropylamine | 3,3'-ethylenebis(tetrahydro-5-isopropyl-2H-1,3,5-thiadiazine-2-thione). |
| 5 | do | do | Isobutylamine | 3,3'-ethylenebis(tetrahydro-5-isobutyl-2H-1,3,5-thiadiazine-2-thione). |
| 6 | do | do | tert-Butylamine | 3,3'-ethylenebis(tetrahydro-5-tert-butyl-2H-1,3,5-thiadiazine-2-thione). |
| 7 | do | do | 2-ethanolamine | 3,3'-ethylenebis[tetrahydro-5-(2-hydroxy-ethyl)-2H-1,3,5-thiadiazine-2-thione]. |
| 8 | do | do | 3-ethoxypropyl-amine | 3,3'-ethylenebis[tetrahydro-5-(3-ethoxy-propyl)-2H-1,3,5-thiadiazine-2-thione]. |
| 9 | do | do | Cyclohexylamine | 3,3'-ethylenebis(tetrahydro-5-cyclohexyl-2H-1,3,5-thiadiazine-2-thione). |
| 10 | do | Acetaldehyde | Ammonia | 3,3'-ethylenebis(tetrahydro-4,6-dimethyl-2H-1,3,5-thiadiazine-2-thione). |
| 11 | do | do | Methylamine | 3,3'-ethylenebis(tetrahydro-4,5,6-trimethyl-2H-1,3,5-thiadiazine-2-thione). |
| 12 | do | do | 2-ethanolamine | 3,3'-ethylenebis[tetrahydro-4,6-dimethyl-5-(2-hydroxyethyl)-2H-1,3,5-thiadiazine-2-thione]. |
| 13 | do | Isobutyraldehyde | Ammonia | 3,3'-ethylenebis(tetrahydro-4,6-diisobutyl-2H-1,3,5-thiadiazine-2-thione). |
| 14 | do | do | Methylamine | 3,3'-ethylenebis(tetrahydro-4,6-diisobutyl-5-methyl-2H-1,3,5-thiadiazine-2-thione). |
| 15 | do | do | 2-ethanolamine | 3,3'-ethylenebis[tetrahydro-4,6-diisobutyl-5-(2-hydroxyethyl)-2H-1,3,5-thiadiazine-2-thione]. |
| 16 | Hexamethylenediamine | Formaldehyde | Ammonia | 3,3'-hexamethylenebis(tetrahydro-2H-1,3,5-thiadiazine-2-thione). |
| 17 | do | do | Methylamine | 3,3'-hexamethylenebis(tetrahydro-5-methyl-2H-1,3,5-thiadiazine-2-thione). |
| 18 | do | do | Ethylamine | 3,3'-hexamethylenebis(tetrahydro-5-ethyl-2H-1,3,5-thiadiazine-2-thione). |
| 19 | do | do | Isopropylamine | 3,3'-hexamethylenebis(tetrahydro-5-iso-propyl-2H-1,3,5-thiadiazine-2-thione). |
| 20 | do | do | Isobutylamine | 3,3'-hexamethylenebis(tetrahydro-5-isobutyl-2H-1,3,5-thiadiazine-2-thione). |

Table I—Continued

| Ex. | Diamine | Aldehyde or ketone | Amine | Product |
|---|---|---|---|---|
| 21 | ----do---- | ----do---- | tert-Butylamine | 3,3'-hexamethylenebis(tetrahydro-5-tert-butyl-2H-1,3,5-thiadiazine-2-thione). |
| 22 | ----do---- | ----do---- | 2-ethanolamine | 3,3'-hexamethylenebis[tetrahydro-5-(2-hydroxyethyl)-2H-1,3,5-thiadiazine-2-thione]. |
| 23 | ----do---- | ----do---- | 3-ethoxypropylamine | 3,3'-hexamethylenebis[tetrahydro-5-(3-ethoxypropyl)-2H-1,3,5-thiadiazine-2-thione]. |
| 24 | ----do---- | ----do---- | Cyclohexylamine | 3,3'-hexamethylenebis(tetrahydro-5-cyclohexyl-2H-1,3,5-thiadiazine-2-thione). |
| 25 | ----do---- | Acetaldehyde | Ammonia | 3,3'-hexamethylenebis(tetrahydro-4,6-dimethyl-2H-1,3,5-thiadiazine-2-thione). |
| 26 | ----do---- | ----do---- | Methylamine | 3,3'-hexamethylenebis(tetrahydro-4,5,6-trimethyl-2H-1,3,5-thiadiazine-2-thione). |
| 27 | ----do---- | ----do---- | 2-ethanolamine | 3,3'-hexamethylenebis[tetrahydro-4,6-dimethyl-5-(2-hydroxyethyl)-2H-1,3,5-thiadiazine-2-thione]. |
| 28 | ----do---- | Isobutyraldehyde | Ammonia | 3,3'-hexamethylenebis(tetrahydro-4,6-diisobutyl-2H-1,3,5-thiadiazine-2-thione). |
| 29 | ----do---- | ----do---- | Methylamine | 3,3'-hexamethylenebis(tetrahydro-4,6-diisobutyl 5-methyl-2H-1,3,5-thiadiazine-2-thione). |
| 30 | ----do---- | ----do---- | 2-ethanolamine | 3,3'-hexamethylenebis[tetrahydro-4,6-diisobutyl 5-(2-hydroxyethyl)-2H-1,3,5-thiadiazine-2-thione]. |
| 31 | 1,4-diaminobutene-2 | Formaldehyde | Ammonia | 3,3'-(2-butenylene)bis(tetrahydro-2H-1,3,5-thiadiazine-2-thione). |
| 32 | ----do---- | ----do---- | Methylamine | 3,3'-(2-butenylene)bis(tetrahydro-5-methyl-2H-1,3,5-thiadiazine-2-thione). |
| 33 | ----do---- | ----do---- | 2-ethanolamine | 3,3'-(2-butenylene)bis[tetrahydro-5-(2-hydroxyethyl)-2H-1,3,5-thiadiazine-2-thione]. |
| 34 | ----do---- | Acetaldehyde | Ammonia | 3,3'-(2-butenylene)bis(tetrahydro-4,6-dimethyl-2H-1,3,5-thiadiazine-2-thione). |
| 35 | ----do---- | ----do---- | Methylamine | 3,3'-(2-butenylene)bis(tetrahydro-4,5,6-trimethyl-2H-1,3,5-thiadiazine-2-thione). |
| 36 | 2-hydroxy-1,3-diaminopropane. | Formaldehyde | Ammonia | 3,3'-(2-hydroxytrimethylene)bis(tetrahydro-2H-1,3,5-thiadiazine-2-thione). |
| 37 | ----do---- | ----do---- | Isopropylamine | 3,3'-(2-hydroxytrimethylene)bis(tetra-hydro-5-isopropyl-2H-1,3,5-thiadiazine-2-thione). |
| 38 | ----do---- | ----do---- | Isobutylamine | 3,3'-(2-hydroxytrimethylene)bis(tetra-hydro-5-isobutyl-2H-1,3,5-thiadiazine-2-thione). |
| 39 | ----do---- | ----do---- | tert-Butylamine | 3,3'-(2-hydroxytrimethylene)bis(tetrahydro-5-tert-butyl-2H-1,3,5-thiadiazine-2-thione). |
| 40 | ----do---- | ----do---- | 2-ethanolamine | 3,3'-(2-hydroxytrimethylene)bis[tetrahydro-5-(2-hydroxyethyl)-2H-1,3,5-thiadiazine-2-thione]. |
| 41 | ----do---- | ----do---- | 3-ethoxypropyl-amine | 3,3'-(2-hydroxytrimethylene)bis[tetrahydro-5-(3-ethoxypropyl)-2H-1,3,5-thiadiazine-2-thione]. |
| 42 | ----do---- | ----do---- | Cyclohexylamine | 3,3'-(2-hydroxytrimethylene)bis(tetrahydro-5-cyclohexyl-2H-1,3,5-thiadiazine-2-thione). |
| 43 | ----do---- | Acetaldehyde | Ammonia | 3,3'-(2-hydroxytrimethylene)bis(tetrahydro-4,6-dimethyl-2H-1,3,5-thiadiazine-2-thione). |
| 44 | ----do---- | ----do---- | Methylamine | 3,3'-(2-hydroxytrimethylene)bis(tetrahydro-4,5,6-trimethyl-2H-1,3,5-thiadiazine-2-thione). |
| 45 | 1,4-diaminobutene-2 | Isobutyraldehyde | Ammonia | 3,3'-(2-butenylene)bis(tetrahydro-4,6-diisobutyl-2H-1,3,5-thiadiazine-2-thione). |
| 46 | 1,3-diaminocyclohexane | Formaldehyde | ----do---- | 3,3'-(1-3-cyclohexylene)bis(tetrahydro-2H-1,3,5-thiadiazine-2-thione). |
| 47 | ----do---- | ----do---- | Methylamine | 3,3'-(1,3-cyclohexylene)bis(tetrahydro-5-methyl-2H-1,3,5-thiadiazine-2-thione). |
| 48 | ----do---- | ----do---- | 2-ethanolamine | 3,3'-(1,3-cyclohexylene)bis[tetrahydro-5-(2-hydroxyethyl)-2H-1,3,5-thiadiazine-2-thione]. |
| 49 | ----do---- | ----do---- | Isobutylamine | 3,3'-(1,3-cyclohexylene)bis(tetrahydro-5-isobutyl-2H-1,3,5-thiadiazine-2-thione). |
| 50 | ----do---- | Acetaldehyde | Ammonia | 3,3'-(1,3-cyclohexylene)bis(tetrahydro-4,6-dimethyl-2H-1,3,5-thiadiazine-2-thione). |
| 51 | ----do---- | ----do---- | Methylamine | 3,3'-(1,3-cyclohexylene)bis(tetrahydro-4,5,6-trimethyl-2H-1,3,5-thiadiazine-2-thione). |
| 52 | 1,4-diaminocyclohexane | Formaldehyde | Ammonia | 3,3'-(1,4-cyclohexylene)bis(tetrahydro-2H-3,3,5-thiadiazine-2-thione). |
| 53 | ----do---- | ----do---- | Isobutylamine | 3,3'-(1,4-cyclohexylene)bis(tetrahydro-5-isobutyl-2H-1,3,5-thiadiazine-2-thione). |
| 54 | 2,4-diamino-1-methyl-cyclohexane. | ----do---- | Methylamine | 3,3'-(1-methyl-2,4-cylolhexylene) bis(tetrahydro-5-methyl-2H-1,3,5-thiadiazine-2-thione). |
| 55 | ----do---- | ----do---- | 2-ethanolamine | 3,3'-(1-methyl-2,4-cyclohexylene)bis[tetrahydro-5-(2-hydroxyethyl)-2H-1,3,5-thiadiazine-2-thione]. |
| 56 | ----do---- | Acetaldehyde | Methylamine | 3,3'-(1-methyl-2,4-cyclohexylene)bis(tetra-hydro-4,5,6-trimethyl-2H-1,3,5-thiadiazine-2-thione). |
| 57 | Ethylenediamine | Formaldehyde | Cyanamide | 3,3'-ethylenebis(5-cyano-tetrahydro-2H-1,3,5-thiadiazine-2-thione). |
| 58 | ----do---- | ----do---- | 2-cyano-ethylamine | 3,3'-ethylenebis[5-(2-cyanoethyl)-tetrahydro-2H-1,3,5-thiadiazine-2-thione]. |
| 59 | ----do---- | ----do---- | Sulfamic acid | 5,5'-ethylenebis(tetrahydro-6-thiono-2H-1,3,5-thiadiazine-3-sulfonic acid). |
| 60 | ----do---- | Glyoxalic acid | Methylamine | 3,3'-ethylenebis[5-methyltetrahydro-2-thiono-2H-1,3,5-thiadiazine-4,6-dicarboxylic acid]. |
| 61 | ----do---- | ----do---- | 2-aminoethyl sulfate, potassium salt. | 3,3'-ethylenebis[5-(2-hydroxyethyl)-tetrahydro-2H-1,3,5-thiadiazine-2-thione]-disulfate dipotassium salt. |
| 62 | ----do---- | ----do---- | Glycine | 5,5'-ethylenebis(tetrahydro-6-thiono-2H-1,3,5-thiadiazine-3-acetic acid). |
| 63 | ----do---- | ----do---- | Serine | 5,5'-ethylenebis[tetrahydro-alpha-(1-hydroxyethyl)-6-thiono-2H-1,3,5-thiadiazine-3-acetic acid]. |
| 64 | ----do---- | ----do---- | Methionine | 5,5'-ethylenebis[tetrahydro-6-thiono-2H-1,3,5-thiadiazine-3-alpha-(2-methylthioethyl)acetic acid]. |
| 65 | ----do---- | ----do---- | β-Alanine | 5,5'-ethylenebis(tetrahydro-6-thiono-2H-1,3,5-thiadiazine-3-propionic acid). |
| 66 | ----do---- | ----do---- | Alanine | 5,5'-ethylenebis(tetrahydro-alpha-methyl-6-thiono-2H-1,3,5-thiadiazine acetic acid). |
| 67 | ----do---- | ----do---- | Aspartic acid | 5,5'-ethylenebis(tetrahydro-6-thiono-2H-1,3,5-thiadiazine-3-succinic acid). |
| 68 | ----do---- | Formaldehyde | Glutamic acid | 5,5'-ethylenebis(tetrahydro-6-thiono-2H-1,3,5-thiadiazine-3-alpha-glutaric acid). |
| 69 | ----do---- | ----do---- | Hydroxylamine | 3,3'-ethylenebis(tetrahydro-5-hydroxy-2H-1,3,5-thiadiazine-2-thione). |
| 70 | ----do---- | ----do---- | Methoxyamine | 3,3'-ethylenebis(tetrahydro-5-methoxy-2H-1,3,5-thiadiazine-2-thione). |
| 71 | ----do---- | ----do---- | 2-methoxy-ethylamine | 3,3'-ethylenebis[tetrahydro-5-(2-methoxy)ethyl-2H-1,3,5-thiadiazine-2-thione]. |
| 72 | ----do---- | ----do---- | 2-vinyloxy-ethylamine | 3,3'-ethylenebis[tetrahydro-5-(2-vinyloxy)ethyl-2H-1,3,5-thiadiazine-2-thione]. |
| 73 | ----do---- | ----do---- | Hydrazine | 3,3'-ethylenebis(tetrahydro-5-amino-2H-1,3,5-thiadiazine-2-thione). |

*Table I*—Continued

| Ex. | Diamine | Aldehyde or ketone | Amine | Product |
|---|---|---|---|---|
| 74 | ......do...... | ......do...... | 2-aminoethyl-methyl-sulfide. | 3,3'-ethylenebis[tetrahydro-5-(2-methylthioethyl)-2H-1,3,5-thiadiazine-2-thione]. |
| 75 | ......do...... | ......do...... | 2-chloroethyl-amine. | 3,3'-ethylenebis[5-(2-chloroethyl)-tetrahydro-2H-1,3,5-thiadiazine-2-thione]. |
| 76 | ......do...... | ......do...... | 2-cyclopentenylamine. | 3,3'-ethylenebis[5-(2-cyclopenten-1-yl)-tetrahydro-2H-1,3,5-thiadiazine-2-thione]. |
| 77 | ......do...... | ......do...... | Allyloxyamine. | 3,3'-ethylenebis(5-allyloxytetrahydro-2H-1,3,5-thiadiazine-2-thione). |
| 78 | ......do...... | ......do...... | Hexyloxyamine. | 3,3'-ethylenebis(5-hexyloxytetrahydro-2H-1,3,5-thiadiazine-2-thione). |
| 79 | ......do...... | ......do...... | Glycine sodium salt. | 5,5'-ethylenebis(tetrahydro-6-thiono-2H-1,3,5-thiadiazine-3-acetic acid)-disodium salt. |
| 80 | ......do...... | ......do...... | Glycine trimethyl amine salt. | 5,5'-ethylenebis(tetrahydro-6-thiono-2H-1,3,5-thiadiazine-3-acetic acid) salt with trimethyl amine. |
| 81 | ......do...... | ......do...... | 2-hydroxy propylamine. | 3,3'-ethylenebis[tetrahydro-5-(2-hydroxy)-propyl-2H-1,3,5-thiadiazine-2-thione]. |
| 82 | ......do...... | ......do...... | 2-amino-2-methyl-1,3-propanediol. | 3,3'-ethylenebis[tetrahydro-5-(2-hydroxy-1-hydroxymethyl)-ethyl-2H-1,3,5-thiadiazine-2-thione]. |
| 83 | ......do...... | ......do...... | tris-(Hydroxymethyl)-methylamine. | 3,3'-ethylenebis[tetrahydro-5-(trishydroxymethyl)-methyl-2H-1,3,5-thiadiazine-2-thione]. |
| 84 | ......do...... | ......do...... | 1-amine-2,3-propanediol. | 3,3'-ethylenebis[5-(2,3-dihydroxy)-propyltetrahydro-2H-1,3,5-thiadiazine-2-thione]. |
| 85 | ......do...... | ......do...... | N-(2-hydroxyethyl) ethylenediamine. | 3,3'-ethylenebis[tetrahydro-5-(2-hydroxy-ethylaminoethyl)-2H-1,3,5-thiadiazine-2-thione]. |
| 86 | ......do...... | ......do...... | 2-amino-2-methyl- propanol. | 3,3'-ethylenebis[tetrahydro-5-(2-hydroxy-1,1-dimethylethyl)-2H-1,3,5-thiadiazine-2-thione]. |
| 87 | ......do...... | ......do...... | 2-aminoethane sulfonic acid, sodium salt. | 5,5'-ethylenebis(tetrahydro-6-thiono-2H-1,3,5-thiadiazine-3-ethane sulfonic acid), disodium salt. |
| 88 | ......do...... | Propionaldehyde. | Ammonia. | 3,3'-ethylenebis(4,6-diethyltetrahydro,2H,1,3,5-thiadiazine-2-thione). |
| 89 | ......do...... | Acrolein. | Methylamine. | 3,3'-ethylenebis(tetrahydro-5-methyl-4,6-divinyl-2H-1,3,5-thiadiazine-2-thione). |
| 90 | ......do...... | α-Methyl acrolein. | ......do...... | 3,3'-ethylenebis(tetrahydro-5-methyl-4,6-dimethallyl-2H-1,3,5-thiadiazine-2-thione). |
| 91 | ......do...... | Acetone. | ......do...... | 3,3'-ethylenebis(tetrahydro-4,4,5,6,6-pentamethyl-2H-1,3,5-thiadiazine-2-thione). |
| 92 | ......do...... | Chloracetaldehyde. | ......do...... | 3,3'-ethylenebis[4,6-bis(chloromethyl)-tetrahydro-5-methyl-2H-1,3,5-thiadiazine-2-thione]. |
| 93 | ......do...... | Methoxyacetaldehyde. | ......do...... | 3,3'-ethylenebis[4,6-bis(methoxymethyl)-tetrahydro-5-methyl-2H-1,3,5-thiadiazine-2-thione]. |
| 94 | ......do...... | α,β-Dihydroxy-propionaldehyde. | ......do...... | 3,3'-ethylenebis[4,6-bis(1,2-dihydroxyethyl)-tetrahydro-5-methyl-2H-1,3,5-thiadiazine-2-thione]. |
| 95 | ......do...... | Cyclohexanone. | ......do...... | 3,3'-ethylenebis[5-methyl-1,3,5-thiadiazaspiro(5,5)undecane-2-thione]. |
| 96 | ......do...... | Acetaldehyde. | Hydrazine. | 3,3'-ethylenebis(5-aminotetrahydro-4,6-dimethyl-2H-1,3,5-thiadiazine-2-thione). |
| 97 | Hydrazine. | Formaldehyde. | Methylamine. | Octahydro-5,5'-dimethyl-[3,3'-bis-2H-1,3,5-thiadiazine]-2,2'-dithione. |
| 98 | ......do...... | Acetaldehyde. | ......do...... | Octahydro-4,4',5,5',6,6'-hexamethyl-[3,3'-bis-2H-1,3,5-thiadiazine]-2,2'-dithione. |
| 99 | Butyny-2-lene-1,4-diamine. | Formaldehyde. | ......do...... | 3,3'-2-butynylenebis(tetrahydro-5-methyl-2H-1,3,5-thiadiazine-2-thione). |
| 100 | 1,2-acetylene diamine. | ......do...... | ......do...... | 3,3'-ethynylenebis(tetrahydro-5-methyl-2H1,3,5-thiadiazine-2-thione). |
| 101 | Ornithine. | ......do...... | ......do...... | 2,5-bis(tetrahydro-5-methyl-2-thiono-2H-1,3,5-thiadiazin-3-yl)-valeric acid. |
| 102 | Lysine. | ......do...... | ......do...... | 2,6-bis(tetrahydro-5-methyl-2-thiono-2H-1,3,5-thiadiazin-3-yl)-hexanoic acid. |
| 103 | Ethylenebis oxypropylamine. | ......do...... | ......do...... | 3,3'-ethylenedioxy-di-trimethylenebis(tetrahydro-5-methyl-2H 1,3,5-thiadiazine-2-thione). |
| 104 | Buteny-2-lene-1,4-diamine(cis). | ......do...... | Sulfamic acid, sodium salt. | 5,5'-cis-butenylenebis(tetrahydro-6-thiono-2H-1,3,5-thiadiazine-3-sulfonic acid)disodium salt. |
| 105 | Buteny-2-lene-1,4-diamine(trans). | ......do...... | ......do...... | 5,5'-trans-butenylenebis(tetrahydro-6-thiono-2H-1,3,5-thiadiazine-3-sulfonic acid)disodium salt. |
| 106 | Buteny-2-lene-1,4-diamine. | ......do...... | Cyanamide. | 3,3'-2-butynylenebis(5-cyano-tetrahydro-2H-1,3,5-thiadiazine-2-thione). |
| 107 | Ethylenebis-oxypropylamine. | ......do...... | Hydroxylamine. | 3,3'-ethylenedioxyditrimethylenebis(5-hydroxy-tetrahydro-2H-1,3,5-thiadiazine-2-thione). |
| 108 | Lysine. | ......do...... | 2-amino ethane sulfonic acid, potassium salt. | 2,6-bis[tetrahydro-5-(2-sulfoethyl)-2-thiono-2H-1,3,5-thiadiazin-3-yl]-hexanoic acid dipotassium salt. |
| 109 | Ornithine sodium salt. | ......do...... | Glycine sodium salt. | 5,5'-(1-carboxytetramethylenebis)-tetrahydro-6-thiono-3-acetic acid, trisodium salt. |

The compounds of Table I, when applied to pear trees in accordance with the procedure of Example 2 gives similar control.

EXAMPLE 110

The disodium salt of ethylenebisdithiocarbamic acid is prepared by adding 76.1 parts of carbon disulfide and a solution of 40 parts sodium hydroxide in 250 parts ethanol simultaneously to a stirred reactor containing a solution of 30 parts of ethylenediamine in 500 parts of water and 500 parts of ethanol during 1 hour. The temperature is maintained between 25° and 45° C. by external cooling.

After an additional 2 hours the resulting solution is diluted with 5500 parts of ethanol. A solution of 221 parts of dodecylamine hydrochloride in 750 parts of 95% ethanol is then added during 15 seconds with good agitation. After an additional 10 seconds a solution of 60 parts formaldehyde in 105 parts of water is added during 25 seconds. The temperature is maintained at 25° to 35° C. for 2 hours. The product is isolated by filtration, washed with ethanol and air dried to give a pure white powder containing a substantial amount of 3,3' - ethylenebis(tetrahydro - 5 - dodecyl - 2H - 1,3,5-thiadiazine-2-thione).

This compound when applied to tomato foliage as an aqueous spray containing 0.008% of the compound is found to prevent infection by early blight (*Alternaria solani*).

EXAMPLES 111 TO 147

The following compounds of the present invention are prepared in accordance with the procedure of Example 110 by substituting for the reactants of Example 110 equimolar amounts of the reactants set forth in Table II. (In those cases where the aldehyde is not water soluble, it can be added as an alcohol solution.)

Table II

| Ex. | Diamine | Aldehyde or ketone | Amine | Product |
|---|---|---|---|---|
| 111 | Ethylenediamine | Formaldehyde | Aniline | 3,3'-ethylenebis(tetrahydro-5-phenyl-2H-1,3,5-thiadiazine-2-thione). |
| 112 | ....do.... | ....do.... | p-Toluidine | 3,3'-ethylenebis(tetrahydro-5-p-tolyl-2H-1,3,5-thiadiazine-2-thione). |
| 113 | ....do.... | ....do.... | p-Chloroaniline | 3,3'-ethylenebis(tetrahydro-5-p-chlorophenyl-2H-1,3,5-thiadiazine-2-thione). |
| 114 | ....do.... | Acetaldehyde | Dodecylamine | 3,3'-ethylenebis(tetrahydro-4,6-dimethyl-5-dodecyl-2H-1,3,5-thiadiazine-2-thione). |
| 115 | ....do.... | ....do.... | Aniline | 3,3'-ethylenebis(tetrahydro-4,6-dimethyl-5-phenyl-2H-1,3,5-thiadiazine-2-thione). |
| 116 | ....do.... | Benzaldehyde | Ammonia | 3,3'-ethylenebis(tetrahydro-4,6-diphenyl-2H-1,3,5-thiadiazine-2-thione). |
| 117 | ....do.... | ....do.... | Methylamine | 3,3'-ethylenebis(tetrahydro-4,6-diphenyl-5-methyl-2H-1,3,5-thiadiazine-2-thione). |
| 118 | ....do.... | p-Chlorobenzaldehyde | ....do.... | 3,3'-ethylenebis(tetrahydro-4,6-di-p-chlorophenyl-5-methyl-2H-1,3,5-thiadiazine-2-thione). |
| 119 | Hexamethylenediamine | Formaldehyde | Aniline | 3,3'-hexamethylenebis(tetrahydro-5-phenyl-2H-1,3,5-thiadiazine-2-thione). |
| 120 | ....do.... | ....do.... | p-Toluidine | 3,3'-hexamethylenebis(tetrahydro-5-p-tolyl-2H-1,3,5-thiadiazine-2-thione). |
| 121 | ....do.... | ....do.... | p-Chloroaniline | 3,3'-hexamethylenebis(tetrahydro-5-p-chlorophenyl-2H-1,3,5-thiadiazine-2-thione). |
| 122 | ....do.... | Acetaldehyde | Dodecylamine | 3,3'-hexamethylenebis(tetrahydro-4,6-dimethyl-5-dodecyl-2H-1,3,5-thiadiazine-2-thione). |
| 123 | ....do.... | ....do.... | Aniline | 3,3'-hexamethylenebis(tetrahydro-4,6-dimethyl-5-phenyl-2H-1,3,5-thiadiazine-2-thione). |
| 124 | ....do.... | Benzaldehyde | Ammonia | 3,3'-hexamethylenebis(tetrahydro-4,6-diphenyl-2H-1-3-5-thiadiazine-2-thione) |
| 125 | ....do.... | ....do.... | Methylamine | 3,3'-hexamethylenebis(tetrahydro-4,6-diphenyl-5-methyl-2H-1,3,5-thiadiazine-2-thione) |
| 126 | ....do.... | p-Chlorobenzaldehyde | ....do.... | 3,3'-hexamethylenebis(tetrahydro-4,6-di-p-chlorophenyl-5-methyl-2H-1,3,5-thiadiazine-2-thione). |
| 127 | 1,4-diaminobutene-2 | Formaldehyde | Aniline | 3,3'-(2-butenylene)bis(tetrahydro-5-phenyl-2H-1,3,5-thiadiazine-2-thione). |
| 128 | ....do.... | ....do.... | p-Chloroaniline | 3,3'-(2-butenylene)bis(tetrahydro-5-p-chlorophenyl-2H-1,3,5-thiadiazine-2-thione). |
| 129 | ....do.... | Acetaldehyde | Aniline | 3,3'-(2-butenylene)bis(tetrahydro-4,6-dimethyl-5-phenyl-2H-1,3,5-thiadiazine-2-thione). |
| 130 | 1,3-diaminocyclohexane | Formaldehyde | Dodecylamine | 3,3'-(1,3-cyclohexylene)bis(tetrahydro-5-dodecyl-2H-1,3,5-thiadiazine-2-thione). |
| 131 | ....do.... | ....do.... | Aniline | 3,3'-(1,3-cyclohexylene)bis(tetrahydro-5-phenyl-2H-1,3,5-thiadiazine-2-thione). |
| 132 | ....do.... | p-Chlorobenzaldehyde | Ammonia | 3,3'-(1,3-cyclohexylene)bis(tetrahydro-4,6-di-p-chlorophenyl-2H-1,3,5-thiadiazine-2-thione). |
| 133 | 1,4-diaminocyclohexane | Formaldehyde | Dodecylamine | 3,3'-(1,4-cyclohexylene)bis(tetrahydro-5-dodecyl-2H-1,3,5-thiadiazine-2-thione). |
| 134a | ....do.... | ....do.... | p-Chloroaniline | 3,3'-(1,4-cyclohexylene)bis(tetrahydro-5-p-chlorophenyl-2H-1,3,5-thiadiazine-2-thione). |
| 134b | Ethylenediamine | ....do.... | β-hydroxy tert-butylamine | 3,3'-ethylenebis[tetrahydro-5-(2-hydroxy-1,1-dimethylethyl)-2H-1,3-5-thiadiazine-2-thione]. |
| 134c | ....do.... | ....do.... | Allylamine | 3,3'-ethylenebis[tetrahydro-5-allyl 2H-1,3,5-thiadiazine-2-thione]. |
| 134d | ....do.... | ....do.... | 3-methoxypropylamine | 3,3'-ethylenebis[tetrahydro-5-(3-methoxy-propyl)-2H-1,3,5-thiadiazine-2-thione]. |
| 134e | ....do.... | ....do.... | Propylamine | 3,3'-ethylenebis(tetrahydro-5-propyl-2H-1,3,5-thiadiazine-2-thione). |
| 134f | ....do.... | Butyraldehyde | Ammonia | 3,3'-ethylenebis(tetrahydro-4,6-dipropyl-2H-1,3,5-thiadiazine-2-thione). |
| 134g | ....do.... | ....do.... | Methylamine | 3,3'-ethylenebis(tetrahydro-5-methyl-4,6-dipropyl-2H-1,3,5-thiadiazine-2-thione). |
| 134h | 1,3-diamino-2-propanol | Formaldehyde | ....do.... | 3,3'-2-hydroxymethylenbis[tetrahydro-5-methyl-2H-1,3,5-thiadiazine-2-thione]. |
| 135 | Ethylenediamine | ....do.... | Glycine ethyl ester | 5,5'-ethylenebis[tetrahydro-6-thiono-2H-1,3,5-thiadiazine-3-acetic acid]-diethyl ester |
| 136 | ....do.... | ....do.... | Octadecylamine | 3,3'-ethylenebis(tetrahydro-5-octadecyl-2H-1,3,5-thiadiazine-2-thione) |
| 137 | ....do.... | ....do.... | Octadecenylamine | 3,3'-ethylenebis(tetrahydro-5-octadecenyl-2H-1,3,5-thiadiazine-2-thione). |
| 138 | ....do.... | ....do.... | p-Nitroaniline | 3,3'-ethylenebis[5-(p-nitrophenyl)-tetrahydro-2H-1,3,5-thiadiazine-2-thione]. |
| 139 | ....do.... | ....do.... | 3-nitro-4-chloroaniline | 3,3'-ethylenebis[5-(3-nitro-4-chlorophenyl)-tetrahydro-2H-1,3,5-thiadiazine-2-thione]. |
| 140 | ....do.... | ....do.... | 3,4-dichloroaniline | 3,3'-ethylenebis[5-(3,4-dichlorophenyl)-tetrahydro-2H-1,3,5-thiadiazine-2-thione]. |
| 141 | ....do.... | ....do.... | p-Anisidine | 3,3'-ethylenebis(5-p-methoxyphenyltetrahydro-2H-1,3,5-thiadiazine-2-thione). |
| 142 | ....do.... | ....do.... | 2,4-dimethylaniline | 3,3'-ethylenebis[5-(2,4-xylyl)-tetrahydro-2H-1,3,5-thiadiazine-2-thione]. |
| 143 | ....do.... | ....do.... | Benzylamine | 3,3'-ethylenebis(5-benzyltetrahydro-2H-1,3,5-thiadiazine-2-thione). |
| 144 | ....do.... | ....do.... | p-Chlorobenzylamine | 3,3'-ethylenebis(5-p-chlorobenzyltetrahydro-2H-1,3,5-thiadiazine-2-thione). |
| 145 | ....do.... | 3,4-dichlorobenzaldehyde | methylamine | 3,3'-ethylenebis[4,6-bis(3,4-dichlorophenyl)tetrahydro-5-methyl-2H-1,3,5-thiadiazine-2-thione]. |
| 146 | ....do.... | Dodecylaldehyde | ....do.... | 3,3'-ethylenebis(4,6-didodecyltetrahydro-5-methyl-2H-1,3,5-thiadiazine-2-thione). |
| 147 | ....do.... | Salicylaldehyde | cyclohexylamine | 3,3'-ethylenebis[4,6-(o-hydroxyphenyl)-5,5-dicyclohexyltetrahydro-2H-1,3,5-thiadiazine-2-thione]. |

The compounds of Table II when applied to the foliage of totamto plants in accordance with the procedure of Example 110, give similar control.

In preparing the compounds of the present invention in accordance with Examples 1–147, the following reactants can also be used in place of the reactants set forth in the above examples, with equimolar amounts of these reactants being employed.

Diamines:
1,2-diaminopropane
Trimethylenediamine
1,2-butylenediamine
Tetramethylenediamine
2,3-diaminobutane
Isobutylenediamine
Pentamethylenediamine
2-methyl-1,4-diaminobutane
Oxybis(ethylamine)

Amines:
　　Amylamine
　　Heptylamine
　　Octylamine
　　Laurylamine
　　Allylamine
　　2-amino-1-propanol
　　o-Toluidine
　　m-Toluidine
　　p-Toluidine
　　p-Isopropylphenylamine
　　o-Chloroaniline
　　m-Chloroaniline
　　o-Anisidine
　　m-Anisidine
　　Alpha-naphthylamine
　　Beta-naphthylamine
　　3-chloro-4-methoxyaniline
　　3-bromo-4-butoxyaniline
　　3-fluoro-4-nitroaniline
　　3-(2-ethylhexyloxy)propylamine
　　3-(7-methyloctyloxy)propylamine
　　o-Nitroaniline
　　o-Ethoxyaniline
　　p-Hydroxyaniline
　　o-Hydroxyaniline
　　2,5-dichloroaniline
　　2,4-dichloroaniline
　　Cumidine
　　2-methyl-4-isopropylaniline
　　p-Butoxyaniline
　　p-Tert. butylaniline
Aldehydes:
　　Caproic aldehyde
　　Cis-crotonic aldehyde
　　Trans-crotonic aldehyde
　　2,2-dimethyl-3-hydroxypropionaldehyde
　　Beta-methoxyisobutyraldehyde
　　Cyclopentylaldehyde
　　m-Tolualdehyde
　　p-Tolualdehyde
　　o-Chlorobenzaldehyde
　　m-Chlorobenzaldehyde
　　o-Methoxybenzaldehyde
　　m-Methoxybenzaldehyde
　　p-Methoxybenzaldehyde
　　Dichloroacetaldehyde
　　3,4-dimethoxybenzaldehyde
　　3,4-dihydroxybenzaldehyde
　　2,4-dihydroxybenzaldehyde
　　3,4-dimethylbenzaldehyde
　　p-Dodecylbenzaldehyde
　　2-methyl-4-isopropylbenzaldehyde
　　3-chloro-4-nitrobenzaldehyde
　　p-Formylbenzoic acid
　　Aldol
　　Glucose
　　2-ethyl-3-propylacrolein
　　Citronellal
　　β-Ethoxypropionaldehyde
　　Ethyl glyoxalate
　　o-Methylbenzaldehyde
　　p-Hydroxybenzaldehyde
　　o-Nitrobenzaldehyde
　　m-Nitrobenzaldehyde
　　2,4-dimethylbenzaldehyde
　　2,4-dichlorobenzaldehyde
　　2,5-dichlorobenzaldehyde
　　Hexyloxybenzaldehyde
　　2,6-dichlorobenzaldehyde The following examples further illustrate the fungicidal activity of the compounds of the present invention:

EXAMPLE 148

The following wettable powder composition is diluted with water to give a 0.2% concentration of the active ingredient. The resultant composition, when sprayed on tomato foliage, substantially prevents infection by early blight (*Alternaria solani*).

|  | Percent |
|---|---|
| 3,3′ethylenebis(tetrahydro-5-cyclohexyl-2H-1,3,5-thiadiazine-2-thione) | 50 |
| Sodium lauryl sulfate | 0.5 |
| Sodium lignin sulfonate | 1 |
| Kaolin clay | 48.5 |

EXAMPLE 149

The following wettable powder when dispersed in water at a concentration of 2 pounds per 100 gallons of water and sprayed on tomato foliage at a rate of 100 gallons per acre, prevents early blight (*Alternaria solani*).

|  | Percent |
|---|---|
| 3,3′-hexamethylenebis[tetrahydro-5-(2-hydroxyethyl)-2H-1,3,5-thiadiazine-2-thione] | 80 |
| Alkyl naphthalene sulfonic acid sodium salt | 0.75 |
| Low viscosity methyl cellulose | 0.25 |
| Silica | 19 |

EXAMPLE 150

A fungicidal dust composition of 3,3′-hexamethylenebis(tetrahydro-5-p-tolyl-2H-1,3,5-thiadiazine-2-thione) is prepared. When dusted on bean plants at the rate of 10 pounds of active ingredient per acre, bean rust (*Uromyces appendiculatus*) is controlled.

|  | Percent |
|---|---|
| 3,3′-hexamethylenebis(tetrahydro-5-p-tolyl-2H-1,3,5-thiadiazine-2-thione) | 20 |
| Stearated calcium carbonate | 80 |

EXAMPLE 151

3,3′-ethylenebis(tetrahydro-5-n-butyl-2H-1,3,5 - thiadiazine-2-thione) is applied to tomato foliage as an aqueous dispersion at a concentration of 0.2%. When the spray deposit dries, the foliage is inoculated with the spores of the early blight fungus (*Alternaria solani*). After a suitable incubation time the leaves are examined for disease. It is found that the treated leaves have no disease while untreated control leaves have 100% disease.

The same compound is applied to bean plants as an aqueous suspension at a concentration of 0.008%. When the spray deposit has dried, the plants are exposed to infection by the spores of bean rust (*Uromyces appendiculatus*). After a suitable incubation period it is found that the treated plants have very little infection whereas untreated control plants have 100% infection.

EXAMPLE 152

This compound is formulated as a dust that is suitable for application by means of conventional dusting equipment by blending the active and minor diluents together and passing them through a micropulverizer, then blending the product with the major diluent in a ribbon blender.

|  | Percent |
|---|---|
| 3,3′-ethylenebis(tetrahydro-4,5,6-trimethyl-2H-1,3,5-thiadiazine-2-thione) | 25 |
| Pyrophyllite | 69 |
| Attapulgite | 6 |

This fungicidal composition, when dusted on tomato plants at a rate of 3 pounds per acre of active ingredient prevents infection by early blight (*Alternaria solani*).

EXAMPLE 153

3,3′-(2-butenylene)bis(tetrahydro-5-methyl-2H - 1,3,5- thiadiazine-2-thione) is formulated as a fungicidal dust having the following composition:

| | Percent |
|---|---|
| 3,3'-(2-butenylene)bis(tetrahydro-5-methyl-2H-1,3,5-thiadiazine-2-thione) | 20 |
| Tobacco dust | 80 |

This fungicidal dust is prepared by bleending the listed ingredients and passing them through a micropulverizer. When the composition is dusted on pear trees at the rate of 10 pounds per acre of active ingredient, it is found to prevent pear scab (*Venturia pyrina*).

EXAMPLE 154

3,3'-(1,3-cyclohexylene)bis(tetrahydro-5-methyl-2H-1,3,5-thiadiazine-2-thione) is formulated to a wettable powder fungicidal composition by blending the list of ingredients together and passing them twice through a micropulverizer. The resulting powder disperses readily in water to yield a fungicidal spray composition.

| | Percent |
|---|---|
| 3,3'-(1,3-cyclohexylene)bis(tetrahydro-5-methyl-2H-1,3,5-thiadiazine-2-thione) | 80 |
| Alkyl naphthalene sulfonic acid sodium salt | 0.75 |
| Low viscosity methyl cellulose | 0.25 |
| Silica | 19 |

This wettable powder, when dispersed in water at a concentration of 6 pounds per 100 gallons of water and sprayed on tomato foliage at the rate of 100 gallons per acre, prevents infection by early blight (*Alternaria solani*).

EXAMPLE 155

3,3'-ethylenebis(tetrahydro-5-phenyl-2H-1,3,5-thiadiazine-2-thione) is prepared as a wettable powder of the following composition:

| | Percent |
|---|---|
| 3,3'-ethylenebis(tetrahydro-5-p-henyl-2H-1,3,5-thiadiazine-2-thione) | 80. |
| Alkyl naphthalene sulfonic acid sodium salt | 0.75 |
| Low viscosity methyl cellulose | 0.25 |
| Diatomaceous earth | 19 |

This wettable powder, when dispersed in water at a concentration of 2 pounds per 100 gallons of water and sprayed on apple trees at a rate of 100 gallons per acre prevents infection by apple scab (*Venturia inaequalis*).

EXAMPLE 156

| | Percent |
|---|---|
| 3,3'-(1,4-cyclohexylene)bis(tetrahydro-5-dodecyl-2H-1,3,5-thiadiazine-2-thione) | 30 |
| Octyl alcohol | .005 |
| Sodium lignin sulfonate | 15 |
| Hydrated attapulgite | 1.75 |
| Water | 53.245 |

The above compounds are mixed together and ground with suitable milling equipment, e.g., a pebble mill or sand mill, until the active material is substantially all below 5 microns in particle size. The resultant, stable, aqueous dispersion may then be diluted with water to suitable spray concentration. When sprayed on tomato foliage at the rate of 300 gallons per acre, early blight is prevented (*Alternaria solani*).

The compounds of the present invention illustrated in the following examples are prepared in accordance with either the procedure in Example 2 or Example 110, depending, as will be understood in the art, on whether or not the reactants are water soluble, by substituting for the reactants in those examples equimolar amounts of the appropriate mixed aldehydes, mixed aldehyde and ketone, or mixed ketones, and mixed amines. These compounds can be formulated and used as indicated in the previously described examples.

| Ex. | Compound |
|---|---|
| 157 | 5-ethyltetrahydro-3-[2-(tetrahydro-5-methyl-2-thiono-2H-1,3,5-thiadiazin-3-yl)ethyl]-2H,1,3,5-thiadiazine-2-thione. |
| 158 | Tetrahydro-5-(2-hydroxyethyl)-3-[(tetrahydro-5-methyl-2-thiono-2H-1,3,5-thiadiazin-3-yl)ethyl]-2H-1,3,5-thiadiazine-2-thione. |
| 159 | Tetrahydro-5-(2-hydroxyethyl)-3-[2-(tetrahydro-5-2-hydroxypropyl-2-thiono-2H-1,3,5-thiadiazin-3-yl)ethyl]-2H-1,3,5-thiadiazine-2-thione. |
| 160 | Tetrahydro-5-[2-(tetrahydro-5-hydroxy-2H-1,3,5-thiadiazin-3-yl)ethyl]-6-thiono-2H-1,3,5-thiadiazine-3-acetic acid. |
| 161 | Tetrahydro-5-(2-chloroethyl)-3-[2-(tetrahydro-5-methoxy-2-thiono-2H-1,3,5-thiadiazin-3-yl)ethyl]-2H-1,3,5-thiadiazine-2-thione. |
| 162 | Tetrahydro-5-[2-(tetrahydro-5-(2-methoxyethyl)-2-thiono-2H-1,3,5-thiadiazin-3-yl)ethyl]-6-thiono-2H-1,3,5-thiadiazine-3-sulfonic acid. |
| 163 | 5-ethyltetrahydro-4,6-dimethyl-3-[2-(tetrahydro-4,5,6-trimethyl-2-thiono-2H-1,3,5-thiadiazin-3-yl)ethyl]-2H-1,3,5-thiadiazine-2-thione. |
| 164 | Tetrahydro-5-(2-hydroxyethyl)-3-[2-tetrahydro-5-methyl-2-thiono-2H-1,3,5-thiadiazin-3-yl)ethyl]-2H-1,3,5-thiadiazine-2-thione. |
| 165 | Tetrahydro-5-(2-hydroxyethyl)-3-[2-(tetrahydro-5-methyl-2-thiono-4,6-divinyl-2H-1,3,5-thiadiazin-3-yl)ethyl]-4,6-divinyl-2H-1,3,5-thiadiazin-2-thione. |
| 166 | Tetrahydro-5-[2-(tetrahydro-5-hydroxy-2H-1,3,5-thiadiazin-3-yl)ethyl]-6-thiono-2H-1,3,5-thiadiazine-3-acetic acid, sodium salt. |
| 167 | Tetrahydro-5-methyl-3-[2-(tetrahydro-5-phenyl-2-thiono-2H-1,3,5-thiadiazin-2-yl)ethyl]-2H-1,3,5-thiadiazine-2-thione. |
| 168 | Tetrahydro-(2-hydroxy-2-methylpropyl)-5,6-dimethyl-3-[2-tetrahydro-5-methyl-2-thiono-2H-1,3,5-thiadiazin-3-yl]-ethyl-2H-1,3,5-thiadiazine-2-thione). |
| 169 | Tetrahydro-5-methyl-3-[2-(tetrahydro-5-methyl-2-thiono-2H-1,3,5-thiadiazin-3-yl)ethyl]-6-(2,4,5-trichlorophenyl)-2H-1,3,5-thiadiazine-2-thione. |
| 170 | Tetrahydro-5-methyl-3-[2-(tetrahydro-5-methyl-2-thiono-2H-1,3,5-thiadiazin-3-yl)ethyl]-6-(3,4-xylyl)-2H-1,3,5-thiadiazine-2-thione. |
| 171 | Tetrahydro-4,4,5-trimethyl-6-(p-nitrophenyl)-3-[2-(tetrahydro-5,6,6-trimethyl-4-(p-nitrophenyl)-2-thiono-2H-1,3,5-thiadiazin-3-yl-ethyl]-2H-1,3,5-thiadiazine-2-thione. |
| 172 | Tetrahydro-5,6-dimethyl-3-[2-(tetrahydro-5-methyl-2H-1,3,5-thiadiazin-3-yl-ethyl]-2H-1,3,5-thiadiazine-2-thione. |
| 173 | Tetrahydro-5,6-dimethyl-6-phenyl-3-[2-(tetrahydro-5-methyl-2-thiono-2H-1,3,5-thiadiazin-3-yl.ethyl]-2H-1,3,5-thiadiazine-2-thione. |

The fungicidal compounds of the present invention are subject to decomposition at low pH values. Acidic concentrations giving pH values below 6.0 are particularly detrimental to these compounds. In field use it is common practice to combine fungicides with other pesticidal agents and plant growth regulants. Many of the pesticides which, in use, might be combined with the fungicidal compositions disclosed herein are acidic in nature and might accelerate decomposition of the active fungicidal compounds of this invention. To counteract the effect of any acidic pesticidal or plant growth regulant materials which might be added to the compositions of this invention, formulations of these compounds can be prepared which contain buffering agents. Any conventional buffering agent can be used and this term is used in its ordinary sense. Among the many, many suitable ones can be named for purposes of illustration and not limitation:

Sodium tetraborate
Disodium hydrogen phosphate
Sodium pyrophosphate
Sodium bicarbonate
Potassium tetraborate
Potassium bicarbonate
Dipotassium hydrogen phosphate
Ammonium dibasic phosphate
Sodium metaphosphate These buffering agents are selected to maintain pH values in the range 6.0–9.0 when the formulations are slurried in water at use concentrations. The following examples, in which parts are by weight, illustrate buffer-containing formulations of this type.

EXAMPLE 174

A composition is prepared as follows:
80.0% of the compound of Example 10 as active ingredient
5.0 disodium hydrogen phosphate, anhydrous
3.0 partially desulfonated sodium lignin sulfonates 4.0 sodium alkyl naphthalene sulfonate
8.0 sericite The formulation is prepared by thoroughly blending all of the ingredients and grinding in a micropulverizer or in an air attrition mill.

EXAMPLE 175

A composition is prepared as follows:
80.0% of the compound of Example 7
5.0 sodium tetraborate (borax)
3.0 partially desulfonated sodium lignin sulfonates
3.0 dioctyl sodium sulfosuccinate concreted on 15% sodium benzoate
9.0 kaolin clay The ingredients are thoroughly blended and ground in a micropulverizer or in an air attrition mill.

The preceding two examples of formulation according to this invention that contain a buffering agent can be readily repeated, as will be understood by persons in the art, by substituting different known buffering agents and different active ingredients of this invention in the same or different amounts to attain a desired effect in accordance with the teachings herein.

This application is a continuation-in-part of my copending application Serial No. 809,597, filed April 29, 1959, which in turn is a continuation-in-part of my application Serial No. 790,049, filed January 30, 1959, and both now abandoned, which in turn is a continuation-in-part of my application Serial No. 713,314, filed February 5, 1958, and now abandoned.

I claim:
1. A compound of the formula

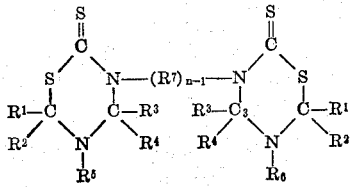

wherein $R^1$ and $R^3$ are selected from the group consisting of hydrogen and methyl; $R^2$ and $R^4$ are selected from the group consisting of hydrogen, alkyl of 1–18 carbons, hydroxyalkyl of 1–18 carbons, alkoxyalkyl of 2–18 carbons, chloroalkyl of 1–18 carbons, carboxy, its salts and esters, carboxyalkyl of 2–18 carbons, their salts, alkenyl of 2–18 carbons, phenyl, chlorophenyl, mononitrophenyl, alkoxyphenyl of 7–18 carbons, carboxyphenyl, hydroxyphenyl, (mononitro)chlorophenyl and alkylphenyl of 7–18 carbons, where ($R_1$ and $R_2$) and ($R_3$ and $R_4$) can be taken together to form a cyclohexyl ring; $R_5$ and $R_6$ are selected from the group consisting of hydrogen, cyano, sulfo, sulfo salts, hydroxy, alkenoxy of 2–18 carbons, alkoxy of 1–18 carbons, amino, alkyl of 1–18 carbons, alkylmercaptoalkyl of 2–18 total carbons, hydroxyalkyl of 2–18 carbons, alkoxyalkyl of 2–18 total carbons, chloroalkyl of 2–18 carbons, carboxyalkyl of 2–18 total carbons, their salts, carboalkoxyalkyl of 3–18 total carbons, sulfatealkyl of 1–18 carbons, their salts, sulfoalkyl of 1–18 carbons, their salts, cyanoalkyl of 2–18 carbons, phenyl, naphthyl, cyclohexyl, cyclopentyl, chlorophenyl, mononitrophenyl, alkylphenyl of 7–18 total carbons, chloro(mononitro)phenyl alkoxyphenyl of 7–18 total carbons, haloalkoxyphenyl of 7–18 total carbons, dialkylphenyl, benzyl, chlorobenzyl, N-(hydroxyalkylaminoalkyl of 3–18 total carbons, hydroxy-carboxyalkyl of 2–18 total carbons, their salts, alkylmercapto-carboxyalkyl of 3–18 total carbons, their salts, and alkenoxyalkyl of 3–18 total carbons; $R^7$ is selected from the group consisting of alkylene of 1–18 carbons, alkenylene of 2–18 carbons, cyclohexylene, hydroxyalkylene of 2–18 carbons, alkylenebis(oxyalkyl) of 3–18 total carbons, alkynylene of 2–18 carbons, carboxyalkylene of 3–18 total carbons, their salts, oxydialkyl of 2–18 total carbons, and alkylcyclohexylene of 7–18 carbons; and $n$ is a positive integer of less than 3.

2. A compound as set forth in claim 1 wherein $R^1$, $R^2$, $R^3$ and $R^4$ are hydrogen, $R_5$ and $R_6$ have less than 5 carbons, and $R^7$ is ethylene.

3. A compound as set forth in claim 1 wherein $R^1$ and $R^3$ are hydrogen, $R^2$, $R^4$, $R^5$ and $R^6$ have less than 5 carbons, and $R^7$ is ethylene.

4. A compound as set forth in claim 1 wherein $R^2$ and $R^4$ are hydrogen, $R^1$, $R^3$, $R^5$, and $R^6$ have less than 5 carbons, and $R^7$ is ethylene.

5. 3,3' - ethylenebis(tetrahydro - 2H - 1,3,5 - thiadiazine-2-thione).

6. 3,3' - ethylenebis(tetrahydro - 5 - beta - carboxyethyl-2H-1,3,5-thiadiazine-2-thione).

7. 3,3'-ethylenebis[tetrahydro-5-(2-hydroxyethylaminoethyl)-2H-1,3,5-thiadiazine-2-thione].

8. 3,3' - ethylenebis(tetrahydro - 5 - benzyl - 2H-1,3,5-thiadiazine-2-thione).

9. 3,3' - ethylenebis(tetrahydro - 5 - beta - hydroxyethyl-2H-1,3,5-thiadiazine-2-thione).

10. 3,3' - ethylenebis(tetrahydro - 4,5,6 - trimethyl-2H-1,3,5-thiadiazine-2-thione).

11. 3,3' - ethylenebis(tetrahydro - 2H - 1,3,5 - thiadiazine-2-thione).

12. 3,3' - ethylenebis(tetrahydro - 4,6 - dimethyl-2H-1,3,5-thiadiazine-2-thione).

13. 3,3' - ethylenebis(tetrahydro - 5 - carboxymethyl-2H-1,3,5-thiadiazine-2-thione).

14. 3,3' - ethylenebis [tetrahydro - 5 - (2 - hydroxy-1,1 - dimethylethyl) - 2H - 1,3,5 - thiadiazine - 2 -thione].

15. 3,3' - ethylenebis(tetrahydro - 5 - methyl - 2H-1,3,5-thiadiazine-2-thione).

16. A fungicidal composition comprising from about 1 to 95% by weight of a compound represented by claim 1 in admixture with an inert solid.

17. A fungicidal composition comprising from about 1 to 95% by weight of a compound represented by claim 1 in admixture with a hydrocarbon liquid diluent.

18. A fungicidal composition comprising from about 1 to 95% by weight of a compound represented by claim 1 and a surface-active agent selected from the group consisting of anionic, cationic and non-ionic surface-active agents.

19. A composition comprising a compound of claim 1 and a buffering agent.

20. The method of preventing fungus attack comprising applying to the locus to be protected a fungicidally effective amount of a compound of claim 1.

References Cited in the file of this patent
FOREIGN PATENTS

| | | |
|---|---|---|
| 1,229,662 | France | Sept. 8, 1960 |
| 213,900 | Austria | Mar. 10, 1961 |